May 11, 1948.　　　A. A. ASHTON　　　2,441,255
COUNTERBALANCE
Filed Jan. 22, 1945　　　3 Sheets-Sheet 1

INVENTOR.
ALBERT A. ASHTON
BY
ATTORNEY

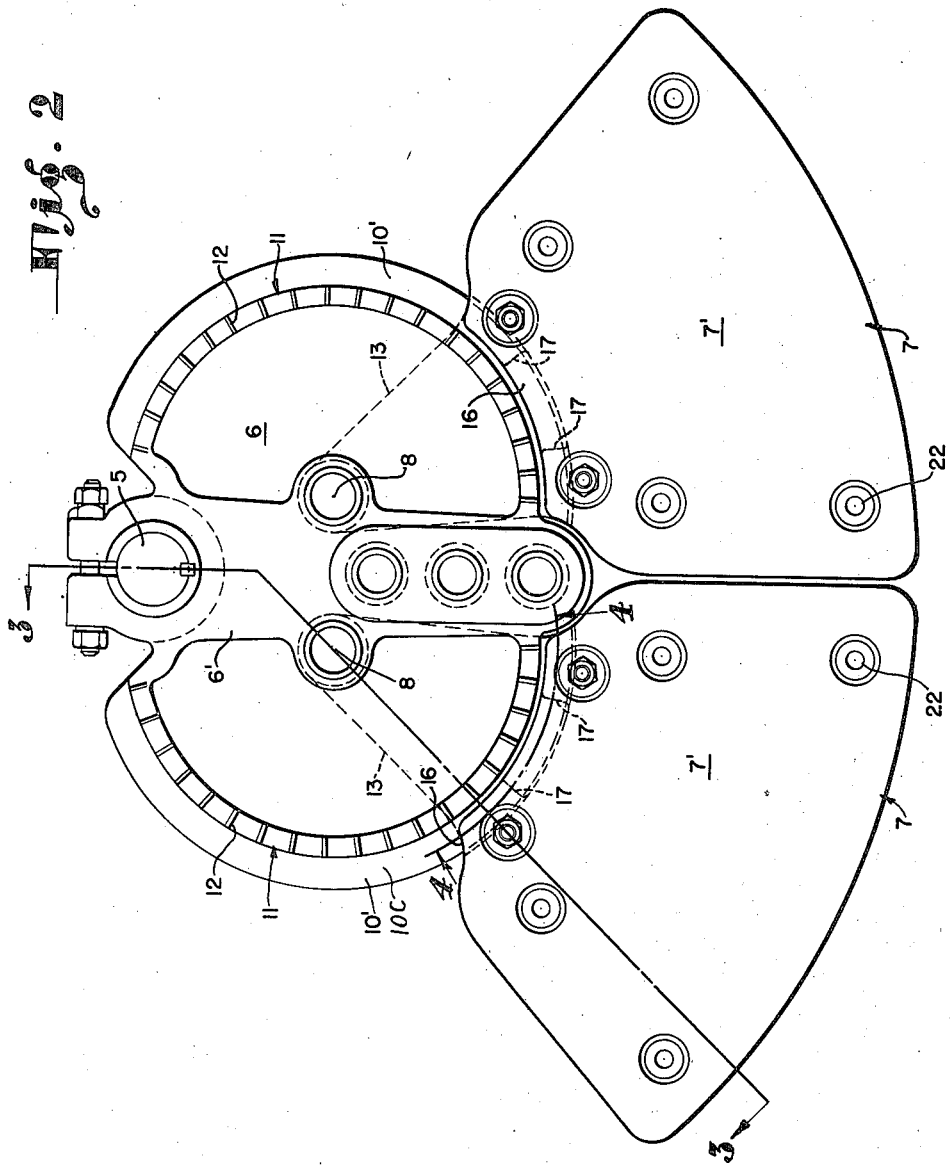

May 11, 1948. A. A. ASHTON 2,441,255
COUNTERBALANCE
Filed Jan. 22, 1945 3 Sheets-Sheet 3
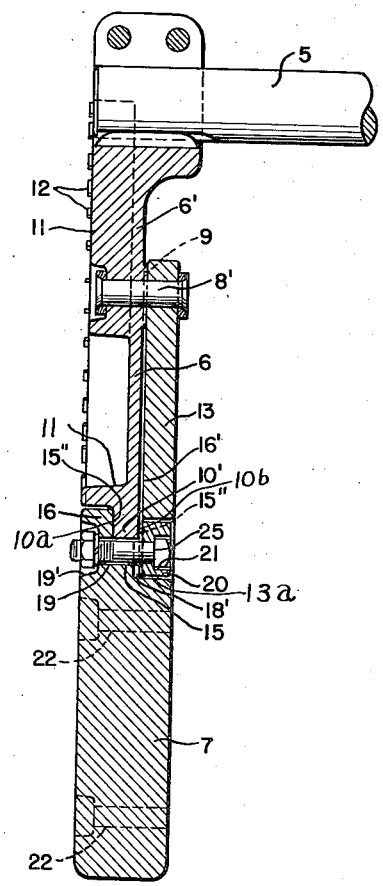
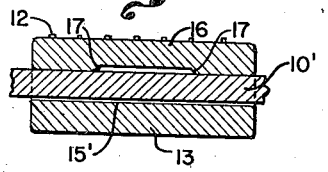
INVENTOR.
ALBERT A. ASHTON
BY
ATTORNEY Patented May 11, 1948

2,441,255

UNITED STATES PATENT OFFICE 2,441,255

COUNTERBALANCE

Albert A. Ashton, Houston, Tex., assignor to Emsco Derrick & Equipment Company, Los Angeles, Calif., a corporation of California Application January 22, 1945, Serial No. 573,994

9 Claims. (Cl. 74—591)

This invention is concerned with the counterbalancing of rotary drive shafts of the type carrying a crank mechanism thereon.

Such shaft and crank assemblies are usually employed to drive a driven member connected to the crank; such, for example, as a connecting rod, or pitman, connected to the oscillatory walking beam of an oil well pump.

In the oil pumping industry there is a demand for a strong, safe, and readily adjustable crank and counterbalance assembly; and it is one of the objects of my invention to provide such a crank and counterbalance assembly.

It is an object of this invention to provide a crank and counterweight assembly in which counterweights are supported thereon by pivots carried by the crank. Instead of being carried by contact with the periphery or edge face of the crank, as is sometimes done, the counterweights do not contact the periphery at all and are hung from the central region of the crank or crank arm, whereby centrifugal forces and other forces of great magnitude can be resisted, and the danger of the counterweight flying off will be reduced to the minimum.

It is another object of the invention to provide a counterweight, which, instead of being held to the crank by mere frictional abutment with the peripheral edge of the crank, will be solidly and rigidly secured to both the front and the rear face of a formation on the crank in overlapping relationship thereto and having frictional engagement with broad areas on both the front face and the rear face of the crank.

In furtherance of the preceding objective, it is an aim of this invention to provide a clamp construction for counterweights, which, although simply and easily engageable with the front and rear faces of the crank or a formation on the crank, will be so constructed and arranged as to unfailingly maintain the counterweight rigidly locked to the crank in any predetermined angular position in the plane thereof, regardless of the magnitude of the mass of the counterweight or its moment of inertia in any angular position, and notwithstanding the great centrifugal forces generated by its rotation.

It is also an object of the invention to provide, in a counterweight, a clamp which can be carried entirely by the counterweight and will include a fixed jaw for overlapping the front face of the crank structure; a movable jaw for overlapping the rear face of the crank; and means for moving the movable jaw towards the fixed jaw with such power and rigidity as to cause the fixed jaw to directly and frictionally engage a broad area on the front face of the crank and the movable jaw to similarly frictionally and directly engage only the rear face of the clamp. Due to the location, construction and arrangement of the clamp parts with reference to the counterweight and the crank, the counterweights can be circumfereneitlally adjusted around the crank towards or away from the crank shaft, to respectively decrease or increase the counterbalancing effect of the counterweights. When the counterweights are swung away from each other, the counterbalancing effect thereof will be less than when they are swung towards each other. When the clamp is set up upon to perform its clamping functions, the so adjusted counterweights will be rigidly and securely held to the crank against the extremely high radially acting centrifugal forces that tend to radially loosen the clamps and cause dislocation of the counterweights.

The invention also provides, in combination with the crank and the counterweights, indicia on the crank for facilitating the adjustments of the counterweights equidistantly from the center line of the crank or shaft so that no unbalanced forces will be brought upon either the crank or the shaft to cause vibration and rupture of same.

The invention also provides for increasing the effective mass of each counterweight by adding individual plate weights to the back face of each weight by removable attaching means.

The other aims and accomplishments of the invention will be made manifest as this disclosure proceeds.

The inventive concepts are made more manifest hereinafter in connection with a showing and description of the presently preferred embodiment of the foregoing and other objects and aims. It is to be understood, however, that the embodiment presently disclosed is merely illustrative, the invention being limited in the embodiments which it can take, only by the scope of the subjoined claims.

In the accompanying drawings,

Fig. 2 is a front elevational view of same;

Fig. 3 is an irregular cross section on line 3—3 of Fig. 2, sighting in the direction of the arrows, and Fig. 4 is a detailed section on line 4—4 of Fig. 2, sighting in the direction of the arrows.

Figure 1:
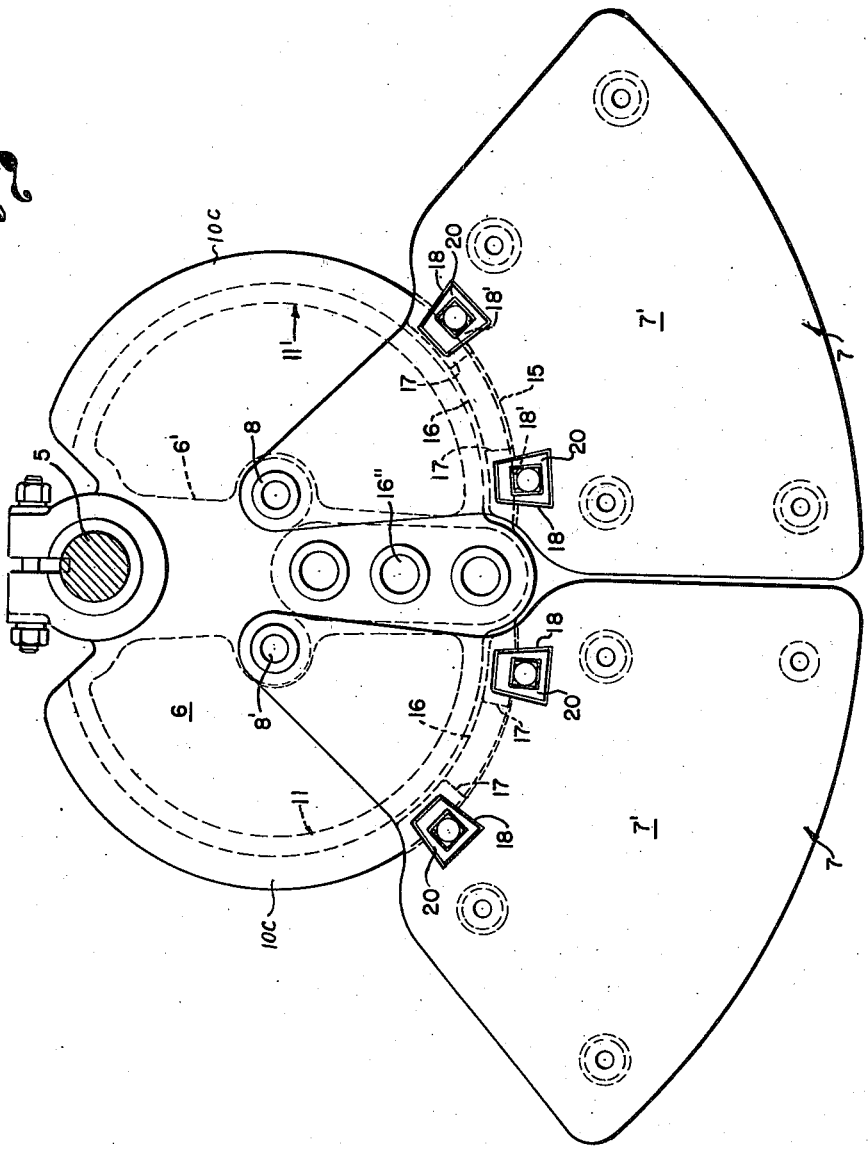
Fig. 1 is a rear elevational view of the crank and counterweight assembly in its presently preferred form.

Referring to the embodiment shown in the drawings, the numeral 5 represents a power or drive shaft which leads from a suitable reducer in the usual manner in oil well pumping apparatus. Secured to the shaft 5 is the crank and counterbalance assembly incorporating the features of my invention. I provide a crank structure which includes a crank 6' and a crank plate 6 carried by and preferably formed integrally therewith. The crank 6' as shown, is relatively thick as compared to the plate 6. The crank structure is secured to the shaft 5 in any suitable manner such as by use of the split strap and key arrangement shown.

Two counterweights 7 are pivoted to the central region of the crank 6' by pivots 8. The pivots 8 are preferably located in lateral alignment substantially centrally of the length of the crank arm, being provided in the form of pivot pins most clearly shown in Fig. 3. The back of the crank plate 6 in this region bears a raised bearing plane or boss or pad 9 on its back, adapted to spacedly engage the upper end of the counterweight, as shown in Fig. 3.

The crank plates 6 have arcuate peripheries which are circumscribed around the pivot centers 8, thus providing an oblate body defined at each end by an arc, the whole having a generally elliptical outline in plan form.

The relationship of parts set forth defines an arcuate flange or lip 10' at the periphery of the crank plate on each side of the crank arm, the lip having a front face 10a, a rear face 10b and an edge face 10c.

Formed on the plate 6 are arcuate formations 11 which are preferably concentric to the pivot centers 8. These formations 11 protrude vertically from the front face of the crank plate and are formed a predetermined distance from the periphery thereof. Together with the front face 10a and edge face 10c of the crank plate, these regions define a guide and track way for a lateral angular adjustment of the counterweights, and as will be made manifest hereinafter, form a stop or restrainer for preventing end thrust movements of the counterweights parallel to the shaft 5.

Each of the arcuate ridges 11 bears a series of equispaced indicia or markers 12, whereby to enable equal lateral angular adjustment of the counterweights away from or towards the crank arm 6'. By virtue of this arrangement and combination of parts, equal torsional or torque forces are generated by each of the counterweights, and brought to bear upon the shaft 5 in equal amounts so that said shaft will not be subjected to unbalanced forces of any kind.

Each of the counterweights 7 comprises a main body or inertia mass 7', this body being of a generally rectangular outline in plan form beyond the periphery of the crank plate and, beginning at said periphery, assuming a laterally contracted shape offset rearwardly from the front face of the counterweight to constitute a radially extending arm or wing 13 on each counterweight. That is to say, the front face of each counterweight is depressed along a circumferential and radial direction inwardly from a point just radially beyond the periphery of the crank plate, to thereby form a curved or arcuate shoulder 13a at the junction of the arm or wing 13 and the rectangular mass 7'.

This arcuate shoulder is kerfed along an arc and along a substantially central plane extending radially inwardly of the massive portion of the counterweight. There is thereby formed a groove 15' having a bottom 15 and two parallel interior faces 15", as shown most clearly in Fig. 3.

Each counterweight is thus provided with a front face lip 16 overlying radially the outer face of each arcuate track way 10' in parallelism therewith, and extending radially of the crank plate and track way for an appreciable and effective distance. The inner face 16' of the arm or wing 13 in this region lies closely adjacent to the back face of the crank plate as shown.

At each end of the outer face of the groove 15' is provided a raised bearing plane or pad 17 having radially extending counterparts 18' near the other face of the groove 15'.

Beginning at the outermost surface of the rear face of each counterweight in the region of the track 10', lip 16, and groove 15', are provided trapezoidal apertures or cutouts 18, here shown as two in number, and extending entirely through each arm 13 and into the kerf or cutout 15' lying transversely of the counterweight directly underneath the lip 16, or substantially so. A bore 19, counterbored as at 19' on the front face of the counterweight, extends through the thickness of the counterweight along a line just tangent to the outer edge face or periphery of the track way on the crank plate. Two of these bores are shown as provided on each counterweight and each barely clears the periphery 10c of the crank plate 6, and each extends at right angles through the groove 15' into the trapezoidal apertures 18.

In each of the trapezoidal apertures 18 there is provided a correspondingly shaped massive block 20 constituting the movable jaw of a clamp, of which the fixed jaw is constituted by the lip 16, the track way 10', fitting snugly in the groove 15', being encompassed between the fixed jaw and the movable jaw.

Each of the trapezoidal blocks 20 has its outer face counterbored, the inner face being traversed by the bore 19. In the counterbore 21 is seated the head of a headed fastener here shown as a bolt 25, the threaded end of the bolt terminating in the counterbore 19' and thereat bearing a suitable anchoring group here shown as a nut and a lock washer bearing tightly against the bottom of the counterbore.

When the nut is set up upon, compressive forces of high magnitude urge the blocks 20 against the rear face of the track ways 10', the other edge of the blocks being seated against the bearing planes 18'. At the same time, an equal and opposite compressive force is set up between the pads 17 and the outer face of the track ways 10' over a large frictional area. By virtue of this distinctive engagement, the counterweight is rigidly and securely united to the crank plate. Hence, although the rate of rotation of oil well pumping shafts such as shaft 5, is usually not very high in revolutions per minute, the centrifugal forces generated by the unusually large and heavy masses 7' will be completely met and neutralized, both in their radial components and their circumferential components. Thus, there will be no likelihood of the counterweight engagement working loose either under radial or circumferential forces. Instead, although each counterweight can be laterally adjusted into a multiplicity of angular positions with reference to the crank plate, once the counterweight clamp is actuated and set up upon to lock the counterweight in position, nothing short of a direct, positive, and intentional loosening of the fastening means 25, will effectuate an unanchoring of the counterweight. The invention includes within its scope the concept of further increasing the mass and moment of inertia of each counterweight by the addition of extra flat plate weights to the back of each counterweight. To this end, a plurality of bolt holes 22, countersunk on the front face of the body 7' are provided, and by these means any desired number of extra plate weights may be added onto the back face of each counterweight.

Other ramifications in construction and refinements in design are contemplated by the present concepts, and all lie within the scope of the present invention.

I claim:

1. In combination in a counterweight having a body and an arm: a lip on one face of the counterweight defining with said arm a groove extending radially of the counterweight body; a block movably inset into the other face of the counterweight; and compressive means having one end mounted in the block and having the other end mounted in the first mentioned face of the counterweight and adapted to compressively urge the lip and the block relatively towards each other.

2. In combination in a counterweight having a body and an arm: a groove in one edge of the body proper defining a lip constituting one jaw of a clamp; the outer face of said counterweight having an aperture substantially in transverse registry with said lip; a movable member constituting the other jaw of said clamp and loosely mounted in said aperture; and means for compressively urging said last member towards said lip.

3. In combination in a counterweight having a body and an arm: a groove in one edge of the body proper defining a lip constituting one jaw of the clamp; the outer face of said counterweight having an aperture substantially in transverse registry with said lip; a movable member constituting the other jaw of same clamp and loosely mounted in said aperture, said counterweight having a bore traversing said lip, said groove and said loose member, substantially at right angles thereto; a headed fastener having its head seated interiorly of the loose member and its shank passing through said bore; and a lip-engaging nut on the non-headed end of said fastener.

4. In combination in a counterweight having a body and an arm: a groove in one edge of the body proper defining a lip constituting one jaw of a clamp; the outer face of said counterweight having an aperture substantially in transverse registry with said lip; a movable member constituting the other jaw of said clamp and loosely mounted in said aperture and held against lateral displacement by the walls of said aperture, and the inner bottom wall of said aperture having a raised bearing plane for frictionally engaging said movable member.

5. In a driving mechanism of the class described: a crank plate having an axis, a peripheral portion of said plate being arcuate and having an axis offset from the axis of said plate at a point spaced considerably inwardly of said peripheral portion and an arcuate formation adjacent said peripheral portion and elevated from the plane of the plate, said formation and peripheral portion defining a track and guideway of arcuate shape; a pivotal member having its axis coincidental with the axis of said peripheral portion; a counterweight pivotally suspended on said pivotal member and adjustable to various angular positions with reference to said plate; and means for locking the counterweight directly to and in contact with both the front face and the rear face of said crank plate.

6. In a driving mechanism of the class described: a crank plate having an axis, a peripheral portion of said plate being arcuate and having an axis offset from the axis of said plate at a point spaced considerably inwardly of said peripheral portion and an arcuate formation adjacent said peripheral portion and elevated from the plane of the plate, said formation and peripheral portion defining a track and guideway of arcuate shape; a pivotal member having its axis coincidental with the axis of said peripheral portion; a counterweight having an arcuately shaped groove for reception of the track and guideway, said counterweight being pivotally suspended on said pivotal member and adjustable to various angular positions with reference to said plate; and means for locking the counterweight directly to and in contact with both the front face and the rear face of said crank plate.

7. In driving mechanism of the class described: a crank plate having an arcuate peripheral part; a counterweight pivotally mounted on said crank plate, said counterweight having a body and an arm; a lip on one face of the counterweight defining with said arm an arcuately shaped groove extending radially of the counterweight and receiving a portion of said peripheral part; a block movably inset into the other face of the counterweight; and compressive means having one end mounted in the block and having the other end mounted in the first mentioned face of the counterweight and adapted to compressively urge the lip and block relatively toward each other for engagement with the front and rear faces of said crank plate.

8. In a device of the class described, including a crank having an arcuately shaped edge portion: a counterweight pivotally mounted to said crank, said counterweight having a body portion and an arm; an arcuate groove in said body portion for reception of the peripheral edge portion of the crank whereby the counterweight may be pivotally moved along said edge portion; a block movably inset into one side wall portion of the groove; and compressive means having one end mounted in the block and having the other end mounted in the opposite wall of the groove and adapted to compressively urge the latter and the block relatively toward each other for clamping engagement against the respective sides of the peripheral edge part of the crank.

9. The invention defined by claim 8, wherein the block is movable laterally of the counterweight and there is means for preventing rotation of said block.

ALBERT A. ASHTON.

REFERENCES CITED

The following references are of record in the file of this patent:

UNITED STATES PATENTS

| Number | Name | Date |
|---|---|---|
| 1,775,390 | Eurit | Sept. 9, 1930 |
| 1,956,158 | Mosher | Apr. 24, 1934 |
| 2,081,141 | Bloss et al. | May 25, 1937 |
| 2,123,676 | Hill | July 12, 1938 |
| 2,213,646 | Butcher | Sept. 3, 1940 |
| 2,218,967 | Athy et al. | Oct. 22, 1940 |
| 2,270,843 | Hartgering et al. | Jan. 27, 1942 |